Sept. 15, 1925.
H. D. HUKILL
1,553,615
MOTOR VEHICLE CONTROL MECHANISM
Filed Jan. 22, 1924
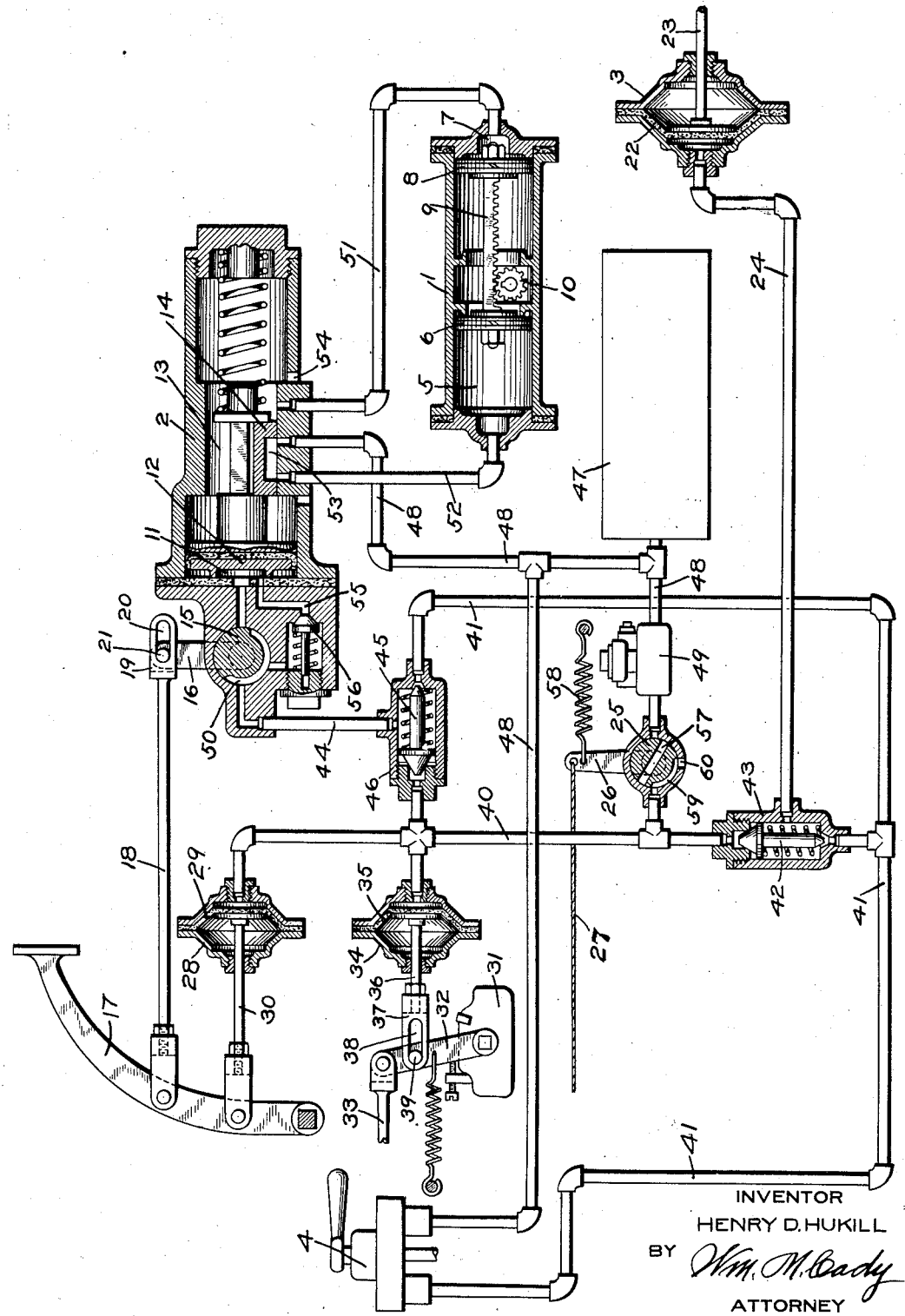
INVENTOR
HENRY D. HUKILL
BY *Wm. M. Cady*
ATTORNEY Patented Sept. 15, 1925.

1,553,615

UNITED STATES PATENT OFFICE.

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MOTOR-VEHICLE CONTROL MECHANISM.

Application filed January 22, 1924. Serial No. 687,857.

*To all whom it may concern:*

Be it known that I, HENRY D. HUKILL, a citizen of the United States, residing at Pittsburgh, in the county of Allegheny and State of Pennsylvania, have invented new and useful Improvements in Motor-Vehicle Control Mechanisms, of which the following is a specification.

This invention relates to safety control equipments for motor vehicles, and more particularly as adapted for automotive passenger busses.

One object of my invention is to provide an equipment of the above character in which by the operation of an emergency device, the brakes will be applied, the doors opened, the engine throttle closed, and the clutch pedal thrown to release the clutch.

In the accompanying drawing, the single figure is a diagrammatic view of a motor vehicle safety control equipment embodying my invention.

As shown in the drawing, the equipment may comprise a fluid pressure door engine 1, a door controlling valve device 2, a brake chamber 3, and a brake valve device 4. The door engine 1 may comprise a casing having a piston chamber 5 containing piston 6 and a piston chamber 7 containing a piston 8.

The pistons 6 and 8 are connected together by a rack rod 9, the teeth of which are adapted to mesh with a pinion 10 and the rotation of said pinion being adapted to effect the opening and closing of the vehicle doors.

The door controlling valve device 2 may comprise a casing having a piston chamber 11 containing a piston 12 and a valve chamber 13 containing a slide valve 14 adapted to be operated by piston 12. A valve 15 having an operating lever 16 is operated to control the admission of fluid under pressure to piston chamber 11 and said valve lever 16 is operatively connected to the usual clutch operating lever 17 of the motor vehicle through a rod 18 having yoke 19 at one end provided with an elongated slot 20 in which a pin 21 carried by lever 17 engages.

The brake chamber 3 may comprise flanged casing sections having interposed flexible diaphragm 22 for operating a brake applying member 23 when fluid under pressure is admitted through pipe 24 to said diaphragm.

In order to apply the brakes, open or balance the vehicle doors, throw out the engine clutch, and close the engine throttle in case of an emergency, a hand operated valve 25 may be provided having an operating arm 26 to which a pull cord 27 may be attached.

Said valve 25 controls the admission of fluid to a diaphragm chamber 28 for operating the clutch lever 17, the chamber 28 containing a flexible diaphragm 29 which is operatively connected to clutch lever 17 through rod 30.

The reference numeral 31 indicates diagrammatically the usual accelerator for the engine of a motor vehicle and having an arm 32 for operating the usual engine throttle. A push rod 33 is connected to said arm for manually operating the throttle and according to my invention the throttle may be operated by fluid pressure when the emergency cord 27 is pulled. For this purpose, a diaphragm chamber 34 is provided, containing a flexible diaphragm 35 adapted to operate a rod 36. Said rod is provided with a yoke 37 having an elongated slot 38 within which a pin 39 carried by the arm 32 engages.

A pipe 40 leads from the valve 25 to the diaphragm chambers 28 and 34 and interposed between the pipe 40 and the straight air pipe 41 is a double check valve 42 contained in casing 43 and adapted to control communication from said pipes to the brake chamber pipe 24. The straight air pipe 41 is also extended to supply fluid to the valve 15 and interposed so as to control communication from pipes 40 and 41 to pipe 44 leading to valve 15 is a double check valve 45 contained in casing 46.

A reservoir 47 containing fluid under pressure is connected by a branched pipe 48 to the door controlling valve device 2, the brake valve device 4, and the valve 25, a reducing valve device 49 being interposed in the pipe connection leading to the valve 25.

In the ordinary operation of the equipment, the accelerator 31 may be operated by the push rod 33 to vary the power of the vehicle engine and if it is desired to apply the brakes, the brake valve device 4 may be operated so as to supply fluid under pressure from pipe 48 to the straight air pipe 41. Fluid then flows past the normally open double check valve 42 to pipe 24 and operates the flexible diaphragm 22 so as to apply the brakes. Fluid supplied to pipe 41 also flows past the normally open double check valve 45 to pipe 44 and when the clutch lever 17 is moved toward the left to throw out the engine clutch, after the clutch is thrown out, the lost motion due to the slot 20 is taken up, so that further movement of the clutch lever operates the arm 16 to rotate valve 15 to a position in which the cavity 50 in the valve connects pipe 44 with piston chamber 11.

Said piston is then shifted to the right, so that the valve 14 is operated to connect pipe 51 with pipe 48 through cavity 53. Fluid under pressure is then supplied to piston chamber 7 while pipe 52 leading to piston chamber 5 is connected to valve chamber 13. Since valve chamber 13 is also open to the atmosphere through port 54, the piston chamber 5 will now be vented to the atmosphere and the pistons 6 and 8 will be shifted to the left or the position for opening the vehicle doors. When the foot is removed from the clutch lever 17, the valve 15 will be returned to its normal position, but the piston 12 will remain in its door opening position until the brakes are released.

When the brakes are released by operation of the brake valve device 4, fluid is also released from piston chamber 11 by way of passage 55, containing check valve 56, cavity 50 in valve 15, and pipe 44.

In case of an emergency, the conductor or a passenger on the car may stop the car by pulling the emergency cord 27, so that the valve 25 is rotated to bring port 57 into line for establishing communication from pipe 48 to pipe 40. Fluid under pressure supplied to pipe 40 will operate the double check valve 42 so as to open communication from pipe 40 to pipe 24, at the same time cutting off the exhaust from the brake chamber pipe 24 through pipe 41 to the brake valve device 4. The flexible diaphragm 22 is then operated to effect an application of the brakes.

Fluid supplied to pipe 40 also flows to the diaphragm chamber 28, so that the flexible diaphragm 29 is operated to effect the shifting of the clutch lever 17 to the position for throwing out the engine clutch. This movement of the clutch lever also effects the operation of the valve 15 so that communication is opened from pipe 44 to piston chamber 11. The double check valve 45 is shifted by the pressure in pipe 40 to open communication from pipe 40 to pipe 44, at the same time cutting off communication from pipe 41 to pipe 44. Fluid will then be supplied to piston chamber 11, so that piston 12 will operate the valve 14 to effect the movement of the door engine 1 to its door opening position, as hereinbefore described.

Fluid pressure in pipe 40 also acts on the flexible diaphragm 35 in the diaphragm chamber 34, so as to shift the rod 36 toward the left and this movement is sufficient to effect the shifting of the arm 32 to the throttle closing position, so that power is cut off from the engine of the motor vehicle. When the emergency cord 27 is released the valve 25 is returned to normal position by spring 58, in which position a cavity 59 therein connects pipe 40 with an exhaust port 60.

It will thus be seen that when the emergency cord is pulled, the brakes will be applied, the vehicle doors opened, the clutch lever operated to throw out the engine clutch, and the throttle of the accelerator operated to cut off power to the engine.

Having now described my invention, what I claim as new and desire to secure by Letters Patents, is:—

1. In a motor vehicle control apparatus, the combination with a fluid pressure brake and fluid pressure mechanism for controlling a vehicle door, of a manually controlled means operable by the motorman for controlling said brake and said mechanism and additional manually controlled means operable by a passenger on the car for controlling said brake and said mechanism in an emergency.

2. In a motor vehicle control apparatus, the combination with an engine clutch lever, a vehicle brake, and door controlling means, of manually operable means for effecting the movement of said clutch lever to disengage the clutch, for operating said door controlling means to open a vehicle door, and for applying the brakes.

3. In a motor vehicle control apparatus, the combination with an engine clutch lever, a vehicle brake, door controlling means, and an engine accelerator, of a single manually operable device for effecting the operation of said clutch lever, the vehicle brake, the door controlling means, and the engine accelerator.

4. In a motor vehicle control apparatus, the combination with fluid pressure operable mechanism for controlling a vehicle door, a fluid pressure operated brake, an engine clutch lever, an engine accelerator, and fluid pressure means for operating said clutch lever and said accelerator, of a manually operable valve for controlling the fluid pressure for operating said door mechanism, the brake, the clutch lever and the accelerator.

5. In a motor vehicle control apparatus, the combination with fluid pressure operable mechanism for controlling a vehicle door, a fluid pressure operated brake, and a brake valve device for controlling the fluid pressure for operating said door mechanism and said brake, of an emergency valve for also controlling the fluid pressure for operating said door mechanism and said brake.

6. In a motor vehicle control apparatus, the combination with fluid pressure operable mechanism for controlling a vehicle door, a fluid pressure operated brake, and a brake valve device for controlling the fluid pressure for operating said door mechanism and said brake, of an emergency valve for also controlling the fluid pressure for operating said door mechanism and said brake, and a double check valve for controlling communication from said brake valve device and said emergency valve to said brake.

7. In a motor vehicle control apparatus, the combination with fluid pressure operable mechanism for controlling a vehicle door, a fluid pressure operated brake, and a brake valve device for controlling the fluid pressure for operating said door mechanism and said brake, of an emergency valve for also controlling the fluid pressure for operating said door mechanism and said brake, and a double check valve for controlling communication from said brake valve device and from said emergency valve to said door mechanism.

8. In a motor vehicle control apparatus, the combination with fluid pressure operable mechanism for controlling a vehicle door, a fluid pressure operated brake, and a brake valve device for controlling the fluid pressure for operating said door mechanism and said brake, of an emergency valve for also controlling the fluid pressure for operating said door mechanism and said brake, a double check valve for controlling communication from said brake valve device and said emergency valve to said brake, and a double check valve for controlling communication from said brake valve device and said emergency valve to said door mechanism.

9. In a motor vehicle control apparatus, the combination with an engine clutch lever, an engine accelerator, a door engine, and a fluid pressure brake, of fluid pressure means for operating said clutch lever and said accelerator and a valve having a position for supplying fluid to said means for operating the clutch lever to throw out the engine clutch and said accelerator to cut off power to the engine, and for supplying fluid for operating the door engine to open the vehicle doors and for applying the fluid pressure brake.

In testimony whereof I have hereunto set my hand.

HENRY D. HUKILL.